United States Patent
Wei (10) Patent No.: US 8,960,960 B2
(45) Date of Patent: Feb. 24, 2015

(54) ILLUMINATION BEAM SHAPING SYSTEM

(75) Inventor: Ching-Wei Wei, Taipei (TW)

(73) Assignees: Ching-Wei Wei, Taipei (TW); Chi-Liang Wei, New Taipei (TW)

( * ) Notice: Subject to any disclaimer, the term of this patent is extended or adjusted under 35 U.S.C. 154(b) by 449 days.

(21) Appl. No.: 12/913,067

(22) Filed: Oct. 27, 2010

(65) Prior Publication Data

US 2012/0057353 A1 Mar. 8, 2012

(30) Foreign Application Priority Data

Sep. 8, 2010 (TW) .............................. 99130270 A (51) Int. Cl.
| | |
|---|---|
| *F21S 8/00* | (2006.01) |
| *F21V 5/00* | (2006.01) |
| *G02B 27/09* | (2006.01) |
| *G02B 19/00* | (2006.01) |
| *F21Y 101/02* | (2006.01) |

(52) U.S. Cl.
CPC ................ *F21V 5/007* (2013.01); *F21V 5/008* (2013.01); *G02B 27/0961* (2013.01); *G02B 19/0023* (2013.01); *G02B 19/0014* (2013.01); *G02B 19/0061* (2013.01); *F21Y 2101/02* (2013.01)
USPC ............. 362/268; 362/336; 362/338; 359/28; 359/485.01

(58) Field of Classification Search
USPC ................... 362/28, 29, 97.2, 97.3, 231, 240, 362/249.02, 268, 301, 308–310, 327, 328, 362/329, 331, 335, 509, 561, 800; 349/57, 349/61, 62, 64; 359/485.01–485.07, 28, 29
See application file for complete search history.

(56) References Cited

U.S. PATENT DOCUMENTS

| | | | | |
|---|---|---|---|---|
| 2,833,176 | A * | 5/1958 | Ossoinak | 352/81 |
| 4,460,940 | A * | 7/1984 | Mori | 362/558 |
| 6,282,027 | B1 * | 8/2001 | Hough | 359/618 |
| 7,009,766 | B2 * | 3/2006 | Hirata et al. | 359/455 |
| 7,258,450 | B2 * | 8/2007 | Koyama et al. | 353/94 |
| 7,711,223 | B2 * | 5/2010 | Chao et al. | 385/37 |
| 7,794,108 | B2 * | 9/2010 | Lai | 362/240 |

* cited by examiner

*Primary Examiner* — Hargobind S Sawhney
(74) *Attorney, Agent, or Firm* — Muncy, Geissler, Olds & Lowe, P.C.

(57) ABSTRACT

The present invention provides an illumination beam shaping system, which enables the emergent surface of a lighting system of light excitation chips to emit a light beam of uniform illumination brightness. The present invention uses a dividing device, structured from curved lenses arranged in an array, to effect a pre-dividing operation on the total quantity of light from a light excitation chip, after which post-diffusion is carried out to form a light beam with uniform illumination brightness. A plurality of conical light beams in an array are shaped and emerge from an output side, and the bottom portion of each of the conical light beams form an actual optical surface, which act on an optical diffusing component for refraction and diffusion processing, thereby enabling the emergent face of the system to obtain uniform illumination brightness.

15 Claims, 5 Drawing Sheets

ILLUMINATION BEAM SHAPING SYSTEM

BACKGROUND OF THE INVENTION (a) Field of the Invention

The present invention provides an illumination beam shaping system, and more particularly provides an illumination beam shaping system which enables the emergent surface of a lighting system of light excitation chips to emit a light beam of uniform illumination brightness. The present invention produces a light beam from a point light source, such as an electrooptical light source, and a division operation is carried out at a position of the cross section of the light in the forward path of the light beam, whereby blocks of small areas of the projected cross section breadth of the light beam are divided and transformed into a plurality of juxtaposed conical light beams at different angular positions, and the bottom surface of each of the conical light beams distanced from the focal points thereof forms an actual optical surface. The actual optical surfaces act on an incident plane of an optical diffusing component, thereby enabling a system light emitting illuminating surface to emit a light beam of uniform illumination brightness.

(b) Description of the Prior Art

Lighting systems can be categorized according to the model type, including far-end projection, near-end illumination and substrate backlight and sign displays. Recently, LED (light-emitting diode) technology has reached maturity, and mainly because of the minute size and easy standardization of light emitting illumination angle of LEDs, thus, large quantities have been directed for use in forming directionable illumination applications, or secondary lighting for small spaces demanding low power, and already occupy a dominating position in illuminating apparatus. Moreover, the visual effects from the ability to modulate wave length and color temperature have been especially received. Although not able to completely replace traditional lamps provided with contextual aesthetic culture, however, its small size certainly has positive uses, being able to miniaturize the external form of illuminating apparatus, thus, related industries have vigorously dedicated use thereof in directional illumination equipment, including desk lamps or sign displays, such as display case lamps or even large outdoor lamps.

Because the size of an LED is very small, thus, its ability to produce power is limited by compression resistance of the material. Hence, a method whereby a cumulative number in a sequential or array arrangement is used to produce relatively high illumination lumen output, however, in a sequential or array assembled arrangement, because of the LED's innate tiny point illumination, thus, during operation, from the point of view of the light emitting illuminating surface, there exists a prominent difference when multiple intense distinctive luminescent points are compared with traditional lamps, especially the uniform illumination performance of fluorescent lamps. Moreover, illumination angle of each of the LEDs is a directional included angle conical illumination, which, particularly in a near-end desk lamp implementation, when acting on an illuminated surface, a block type spectrum with different degrees of light and shade illumination is formed on the surface, thus, the total emergent light must undergo equalization.

The uniform diffusion method adopted in the prior art is an implementation using Fresnel mirrors, perforated plates, or multiple reflection technologies, or scattering effect diffraction grating, all of which are able to carry out light beam shaping on light emitted from an LED light excitation chip to an appropriate degree. However, all the implementations greatly affect the rate of flow of light, resulting in loss in illumination lumen output. Hence, adopting a light beam shaping diffusion method can substantially eliminate lumen loss.

Figure 1:
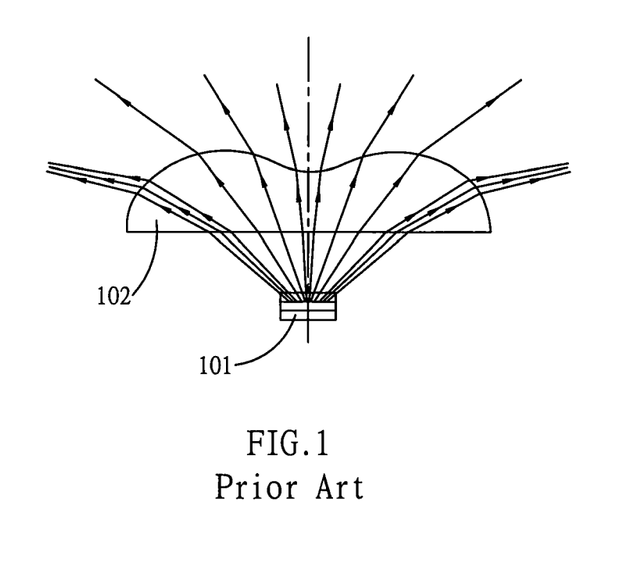
FIG. 1 is a view depicting a single member being used for light diffusion of the prior art.

Designs for light beam shaping of the prior art (as depicted in FIG. 1) comprises a photoelectric component, a light excitation chip 101 able to produce light beams, and a separating optical member 102 provided with an optic axis, and a light beam output surface provided with a concave curved portion and a convex curved portion. At least part of the convex curved portion is distanced from the optic axis and encircles the concave curved portion. The optic axis passes through the concave curved portion, and the convex curved portion is provided with a first area and a second area. The degree of curvature of the first area is less than the degree of curvature of the second area, thereby enabling dispersion of the light beam emitted by the light source into different blocks of light energy within a widening angle range.

Figure 2:
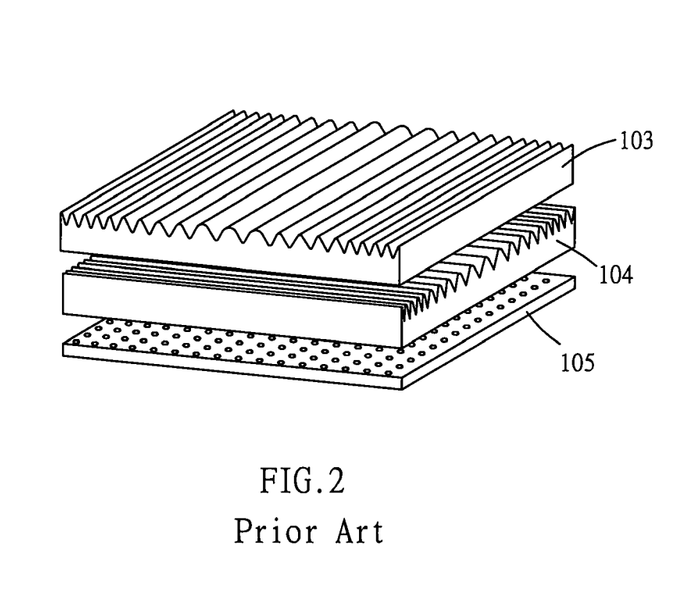
FIG. 2 is a view depicting cylindrical lenses in a cross linking arrangement being used for light division of the prior art.

The Industrial Technology Research Institute of Taiwan have designed an optical diffusion module (as depicted in FIG. 2), comprising a first diffusion structure 103, provided with a plurality of first cylindrical lens and a plurality of second cylindrical lens, the first cylindrical lens and the second cylindrical lens are connected in a mutually continuous cross linking arrangement; a second diffusion structure 104, provided with a plurality of third cylindrical lens and a plurality of fourth cylindrical lens, connected in a mutually continuous cross linking arrangement, a light beam from the light source undergoes diffusion by passing through the first diffusion structure 103 and the second diffusion structure 104, and an additional fitted diffusion membrane 105 assists further diffusion of the emerging light. However, the shape of the light beam after cylindrical mirror refraction is a planar fan-shaped light beam perpendicular to the meridian plane, and because the lengthwise bodies of the cylindrical mirrors are distanced away from the light excitation chip, thus, it is subject to the square factor of the distance, and the refracted light energy close to the front and rear end positions is clearly less than that at the central point. Hence, regarding illumination beam distribution at the emergent face of the system, the lumen output of the refracted light at the center of the emergent face is correspondingly higher. As a consequence of the plurality of juxtaposed cylindrical mirrors, a light beam passing through the module from the light excitation chip results in an effect similar to a double slit interference effect, as proven by Young's slit interference experiments, in which, when an emergent light beam acts on the surface of an illuminated object, alternate stripes of light and shade appear, that is, there is a clear difference in light and shade, and thus does not achieve the objective of light uniformity. In addition, such technology completely adopts a diffusion construct, using the front and rear sets of diffusion structures to effect a two stage pre-diffusion operation, and, lastly, using a diffusion membrane 105 to further effect final diffusion. Furthermore, the first and second diffusion structures are respectively assembled from two sets of lenses, and different refraction curvatures are gradually apportioned to the front and rear breadths of the lenses. Apart from demanding high accuracy during manufacture, after assembling the numerous structural components, the diffusion system easily loses the desired shape, and requires perfect spacing. The aforementioned technology is applied in lamps provided with a cover surface, where shaping of the light beam is carried out for the emerging light, where diffusion effectiveness is finally resolved. However, because the working components are distanced away from the light source, thus, the light energy is already weakened due to the square factor of the distance. A change in directional refraction operation is then carried out, however, because the light energy is already substantially weakened, thus, the working effect is reduced, the reason for which is that because of the innate constraint of the refractive index of the refraction components.

SUMMARY OF THE INVENTION

A primary objective of the present invention is to provide a light excitation chip with electrooptical function which is able to emit a uniform illumination beam from the emergent face of the system through a pre-dividing operation.

In order to achieve the aforementioned objective, the present invention first causes the total quantity of light from the light source to undergo block division by means of a pre-dividing operation in the light emergent path of the light source, by which means each block is shaped into a conical light beam. The focal point of each conical light beam is distant from the bottom portion of the respective actual optical surface, which respectively act on a diffusing component to implement a post-diffusion operation, thereby enabling the illuminating surface of the system to obtain a more uniform illumination brightness.

Another objective of the present invention is to provide the incident face of the diffusing component with a concave curvature, thereby enabling the normals of the concave curvature to overlap with the optic axes of the conical light beams acting on the diffusing component, thus avoiding light refraction loss.

A third objective of the present invention is to fit the dividing device of the system with a plurality of juxtaposed curved lenses, in which the incident light surface of each of the curved lenses is square shaped, thereby enabling a compact arrangement of the lenses to completely receive the total brightness of the light-emitting elements.

A fourth objective of the present invention is to enable the light-emitting elements of the system to be arranged sequentially or in an array, thereby enabling the system, operating in coordination with the dividing device and the diffusing component, to accumulate illumination power.

A fifth objective of the present invention is to enable the bottom surfaces of the conical light beams to mutually intersect or aggregate, thereby changing the light intensity of the actual optical surfaces.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

The present invention relates to a light beam shaping system, which has particular application with light excitation chips, and the like, in which a total quantity of light is split into multiple arrays of conical light beams using pre-dividing means. The actual optical surfaces formed at the bottom portions of the conical light beams simultaneously act on an optical diffusing component, and refraction and diffusion at the optical diffusing component results in illumination brightness of greater uniformity at the light emitting illuminating surface of the system. Let it be known here that the description of the embodiments of the present invention does not take into account oblique incidence at the lens, or spherical aberration.

Figure 3:
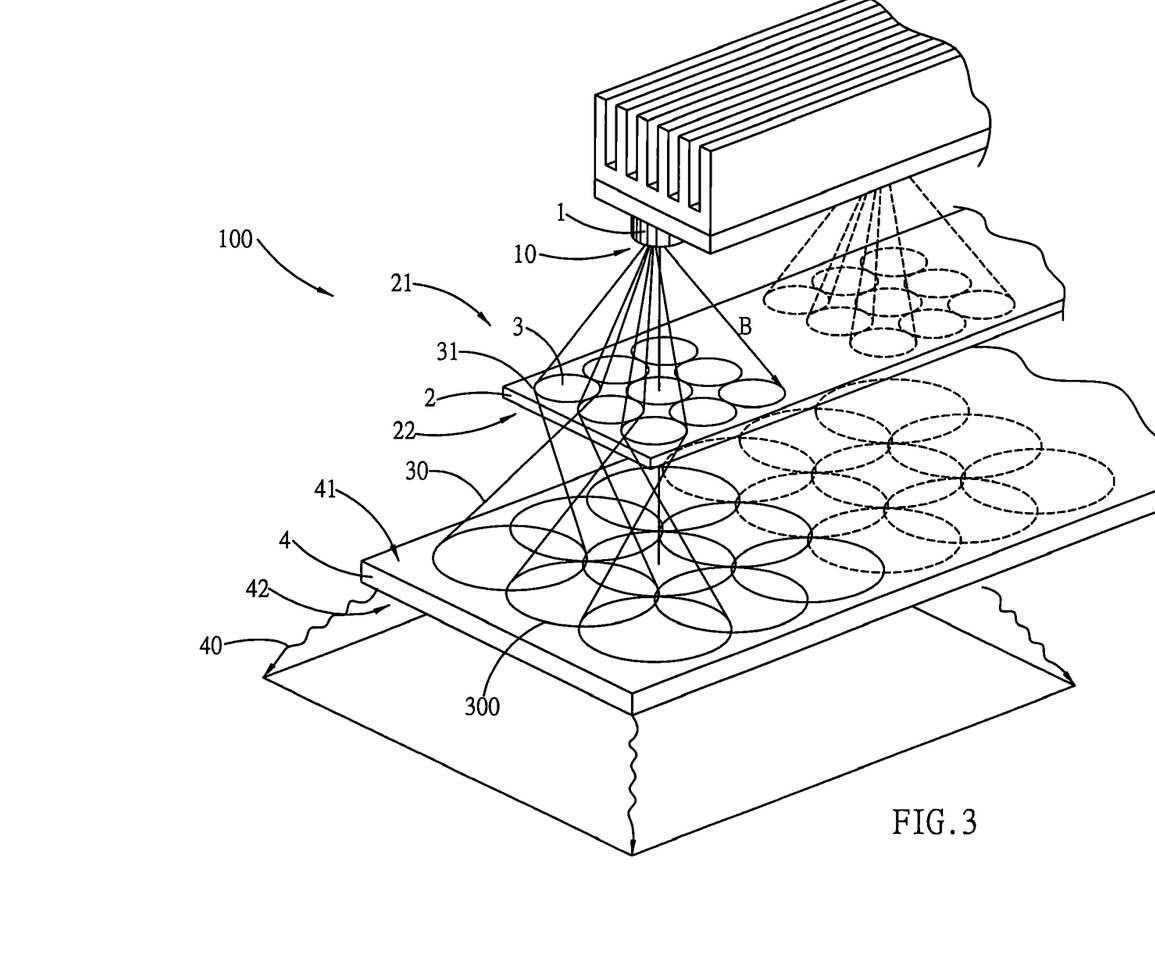
FIG. 3 is an elevational view of the system of the present invention.
Figure 4:
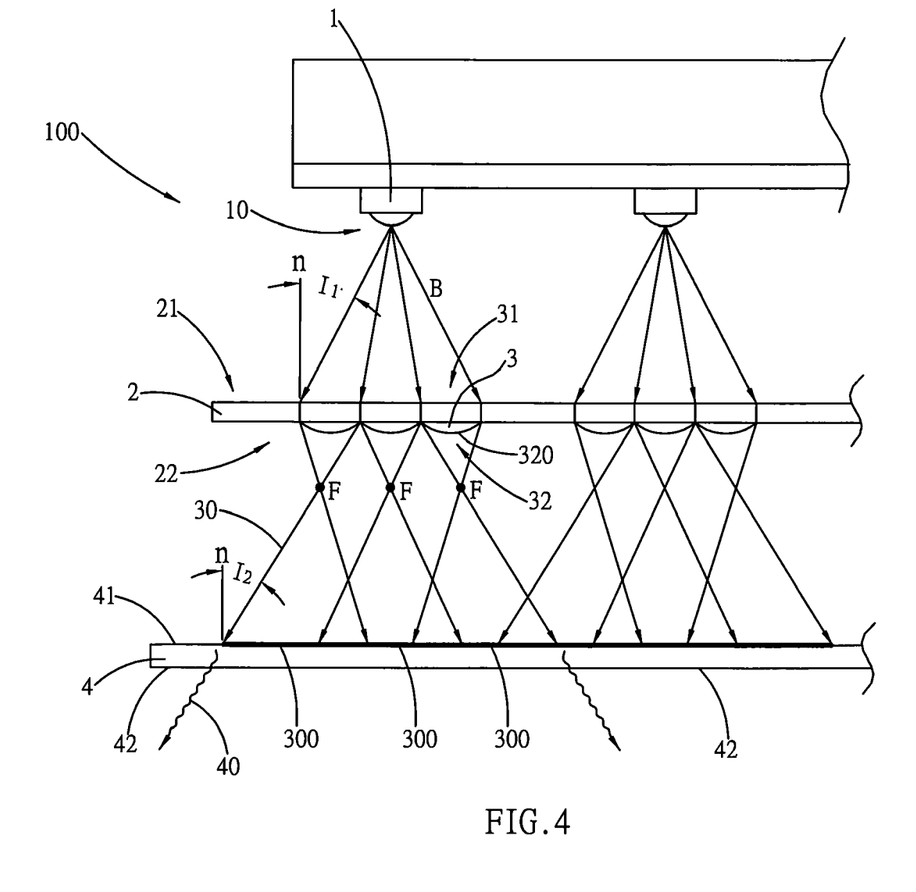
FIG. 4 is a side view of FIG. 3.

Regarding the design, substance and operational principle of the present invention, referring first to FIGS. 3 and 4, which show a shaping system 100 of the present invention, the basic structure of which comprises light-emitting elements 1, a dividing device 2 and a diffusing component 4 of a light excitation chip having an electrooptical function, in which, after light beams produced by the light-emitting elements 1 have undergone shaping by passing through the system, then a uniform illumination beam 40 is emitted from a light emitting illuminating surface 42 of the diffusing component 4.

The shaping concept of the present invention is effected through an electrooptical effect, and comprises disposing the dividing device 2 at a position within an effective included angle range of light emission and light paths of light beams B produced by light excitation chips 10 of the light-emitting elements 1, so as to cut off a cross section of the light beams B, thereby enabling the emitted light beams B to act on the light incident surface of the dividing device 2. After light division through block division by the dividing device 2, the light is transformed into multiple arrays of conical light beams 30. The bottom surface of each of the conical light beams 30 is an actual optical surface, which simultaneously act on the optical diffusing component 4, after which refraction occurs at the system illuminating surface to obtain a uniform illuminating light.

The dividing device 2 comprises a plurality of curved lenses 3 provided with curved surfaces 320 arranged within the breadth of the illuminating light beams B in the form of an array. Moreover, the included hypotenuse angles of the light beams B are within the range of the refraction critical angles at an input side 21 of the dividing device 2. Block division of the total quantity of light of the light beams emitted by the light excitation chips 10 is carried out at an incident light surface 31 of the plurality of curved lens 3, and after respective focusing by the curved lenses 3, the light beams are shaped into a plurality of juxtaposed conical light beams 30 that emerge from emergent surfaces 32 of the curved lens 3 located on an output side 22 of the dividing device 2 in the same forward path direction of the light beams. The bottom portions of the conical light beams 30 are distant from the focal point positions, thereby presenting actual optical surfaces 300, and the plurality of actual optical surfaces 300 are juxtapositioned on the incident plane 41 of the diffusing component 4. The light energy further advances forward, and undergoes refraction and a diffusion effect by the diffusing component 4, after which a uniform illumination beam 40 is emitted from the light emitting illuminating surface 42 of the diffusing component 4, thereby enabling the system to achieve the objective of diffusion of light from light excitation chips.

In which, at the two sides of the light beam B acting on the input side 21 of the dividing device 2, incidence angles 11 of the external diagonals of the light beam B emitted by the light excitation chip 10 of the light-emitting element 1 to normals n correspond to that able to maintain avoiding refraction loss within the angle range of the refraction critical angle. Similarly, after the dividing device 2 transforms the conical light beams 30, incidence angles 12 to normals n at the outermost sides of the juxtapositioned light beams are within the angle range of the refraction critical angle, that is, less than 45 degrees, thereby enabling avoiding refraction loss.

The plurality of conical light beams 30 acting on the incident plane 41 of the diffusing component 4 produce a plurality of actual optical surfaces 300, at which time, the actual optical surfaces 300 are distant from the focal points of the curved lens 3, and the light beams have already been spread out, which is referred to as the first diffusion operation of the light beams. The actual optical surfaces 300 then undergo a second diffusion effect by the diffusing component 4, whereupon the illumination beam 40 of high uniformity refracts out from the light emitting illuminating surface 42 of the diffusing component 4.

The aforementioned shaping process is produced by the single light-emitting element 1, and the illumination beam 40 is emitted from the single area of emission of the light emitting illuminating surface 42 of the diffusing component 4. If the light-emitting elements 1 are in a front and rear sequential arrangement, then the illumination beam 40 with a band type effect can be produced. Moreover, shape of the curved lenses 3 is of circular or square form, the square form is produced by cutting off four corners of the lenses of identical curvature to form mutually perpendicular sides, thereby enabling the lenses to be assembled in a mosaic-like fashion, apart from the assembled lines, other optical surfaces can be acted on by light beams.

Each of the aforementioned conical light beams 30 are respectively transformed and shaped by the curved lenses 3 of the dividing device 2. After undergoing curvature refraction by the dividing device 2, focusing focal points F are formed between the output side 22 of the dividing device 2 and the incident plane 41 of the diffusing component 4, in which the actual optical surfaces 300 are distanced relative to the focal points F, and this distant defocusing is used to pre-scatter the light beams produced by the actual optical surfaces 300 and effect the first light diffusion. The actual optical surfaces 300 then act on the incident plane 41 of the diffusing component 4, where refraction and a diffusion effect takes place, after which the illumination beam 40 of high uniformity is produced at the light emitting illuminating surface 42.

Each of the aforementioned conical light beams 30 act on the incident plane 41 of the diffusing component 4 to form an array type arrangement, in which mutual intersection occurs between the actual optical surfaces 300 of each of the conical light beams 30, or an aggregate arrangement can be made to form, thereby enabling changing the light intensity of the intersecting areas. In addition, the incident light surfaces 31 of the curved lenses 3 of the dividing device 2 can be made to form a circular or square juxtaposed arrangement. The square juxtaposed arrangement can be used to more effectively absorb the light beams produced by the light-emitting elements 1, almost transforming the total quantity of light, and correspondingly obtaining the transformed conical light beams 30 of relatively high light intensity.

Figure 5:
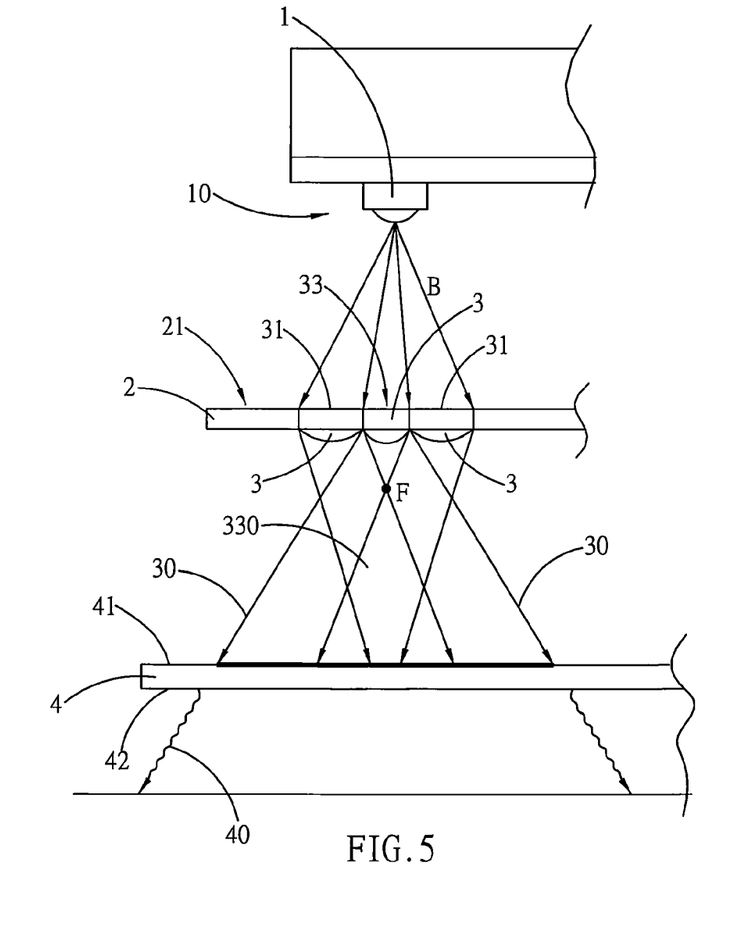
FIG. 5 is a working schematic view depicting a central lens of relatively small light receiving area disposed center of a dividing device according to the present invention.

Referring to FIG. 5, which shows an optical phenomenon, in which the degree of loss after emission of a light beam from a light source is inversely proportional to the square of the optical path distance. Hence, from the electrooptical effect of the light-emitting element 1, the luminous flux of the light beam B emitted by the light excitation chip 10 acting on the input side 21 of the dividing device 2, because the center of the surface of the input side 21 is perpendicular to the light beam axis of the light beam B, thus, light intensity at the central point of the input side 21 is greater than that at the sides of a central lens 33. Furthermore, in a single lens area, the amount of the luminous flux of the light beam decides the intensity of the emitted light. Accordingly, the present invention adopts different area change, in which the incident light surface area at the position of the central lens 33 of the arranged curved lenses 3 of the input side 21 is smaller than the incident light surface areas at the peripheral curved lenses 3. Hence, because the areas are different, thus, the total amount of the luminous flux of the light beam at the central lens 33 is smaller than at the side curved lenses 3, thus, the light intensity of the conical light beams 30 transformed by the side curved lenses 3 will be balanced by the conical light beams 330 transformed by the central lens 33. In other words, in FIG. 5, the area of the incident light surface 31 of each of the curved lenses assembled to form the dividing device 2 has curved lenses 3 of different sizes. Here, the middle lens shown is relatively smaller than the side lenses which results in a different curvature. Accordingly, the incident plane 41 of the diffusing component 4 receives a uniform light. After undergoing refraction and diffusion by the diffusing component 4, the breadth of the light emitting illuminating surface 42 of the diffusing component 4 enables producing the illumination beam 40 of extremely uniform luminance. In addition, a portion of the curved lenses 3 can be provided with different curvatures, thereby causing the positions of the heights of the focal points F to vary, and changing the areas of the actual optical surfaces 300, which thus facilitates effecting actual optical surfaces 300 of different areas, and enables the Incident plane 41 of the diffusing component 4 to obtain a relatively uniform light distribution.

Figure 6:
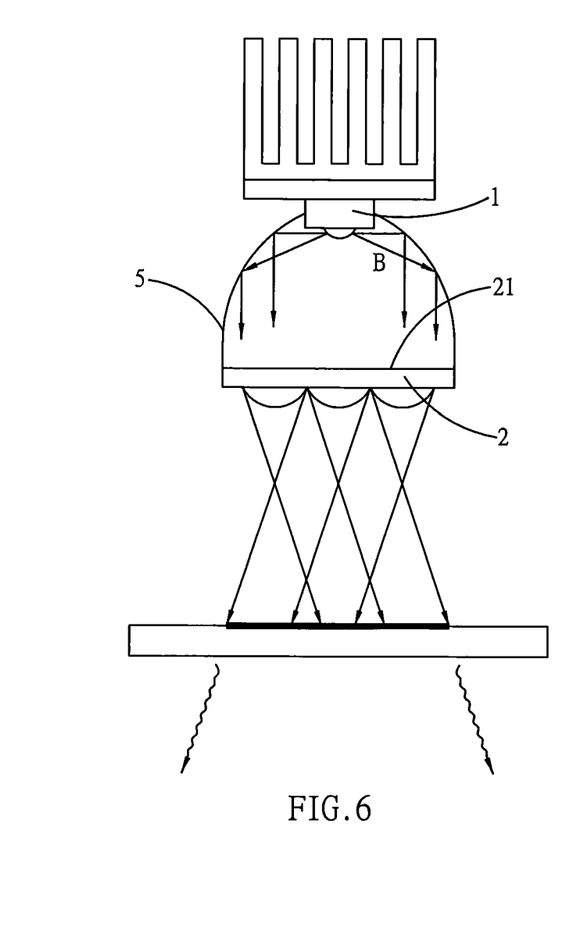
FIG. 6 is a schematic view depicting a reflecting member disposed between a light-emitting element and the dividing device according to the present invention.

Referring to FIG. 6, within a fixed included angle range, the light beam B produced by the light-emitting element 1 of the system contains the total quantity of light, however, because it is impossible for the material of the light-emitting element 1 to be perfectly ideal, thus, the light-emitting element 1 causes a portion of the light to be scattered. For this reason, the present invention has fitted a reflecting member 5 between the area covering the light-emitting element 1 and the input side 21 of the dividing device 2. The reflecting member 5 has an elliptical curvature, thereby enabling practically all light emitted by the light-emitting element 1 from any angle direction to act on the input side 21, thus avoiding loss of light from the light-emitting element 1, and enabling almost perfect use of the light.

Figure 7:
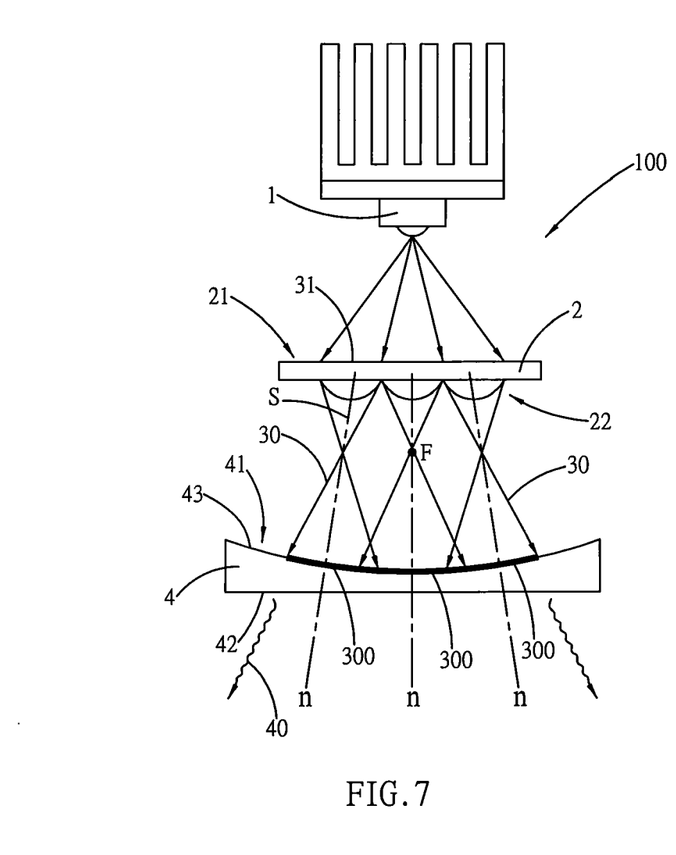
FIG. 7 is a schematic view depicting arrangement of a curved light receiving surface of a diffusing component according to the present invention.

Referring to FIG. 7, the light beam produced by the light-emitting element 1 of the shaping system 100 of the present invention is transformed by the dividing device 2, after which the plurality of conical light beams 30 are produced at the output side 22 of the dividing device 2. The plurality of conical light beams 30 separately form an optical axis S, which act on the incident plane 41 of the diffusing component 4 at different angle deviations, thus, the present invention provides the incident plane 41 of the diffusing component 4 with a curved surface 43 concave in the direction of the dividing device 2. Working normals n of the curved surface 43 respectively overlap with the conical light beams 30, thereby enabling the actual optical surface 300 of each of the conical light beams 30 to uniformly act on the incident plane 41 of the diffusing component 4 with equal luminous flux density, thus avoiding, for example, the inverse ratio of the square of the distance between the light source and an illuminated object affecting different degrees of light being received at the incident plane 41, and enabling the light emitting illuminating surface 42 of the diffusing component 4 to uniformly emit the illumination beam 40.

The main concept of the illumination beam shaping system of the present invention is to carry out a pre-dividing operation on the total light of a light source, such as a light excitation chip, after which post-diffusion is carried out to enable the light emerging from the emergent face of the optical system to have uniform illuminating brightness. The dividing operation uses the separate surface areas of the incident light surfaces of curved lenses fitted to a dividing device to receive light beams produced by a light-emitting element and carry out division of light intensity. After the division operation, a plurality of actual optical surfaces are formed by focusing the light beams, which are projected on to the incident plane of a diffusing component. The actual optical surfaces are provided with actual light energy, and the forward energy thereof undergoes refraction and a diffusion effect by the diffusing component, thereby producing a highly uniform illumination beam at the light emitting illuminating surface of the diffusing component. The system is assembled such that the pre-dividing operation is carried out before the diffusion operation, after division, an explicit block uniform distribution of light is effected, thereby enabling the system to produce a substantially uniform illumination beam. Accordingly, the present invention is an unprecedented design in related art.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. An illumination beam shaping system having total quantity of light form a light excitation chip enabled to undergo a pre-dividing operation, and then post-diffusion to cause an optical illuminating surface of the system to obtain uniform illumination brightness, comprising:
    a light-emitting element, wherein the light-emitting element is a light, excitation chip for producing a light beam with angular illumination;
    a dividing device, which is structured from a planar assembly of a plurality of curved lens provided with curvature arranged in an array, and an assembly of incident light surfaces of the plurality of curved lenses form an input side of the dividing device, while the other side forms an output side assembled from emergent faces of the plurality of curved lenses; the input side faces the light beam projection surface of the light-emitting element;
    an optical diffusing component, provided with an incident plane of curved form with a concave curvature, wherein the incident plane faces the output side of the dividing device, and is positioned at bottom portions, which function as actual optical surfaces, of the conical light beams emitted from the output side,
    wherein each of the curved lenses assembled to form the dividing device has a different curvature.

2. The illumination beam shaping system according to claim 1, wherein the curved lenses assembled to form the dividing device are of square form.

3. The illumination beam shaping system according to claim 1, wherein the bottom portions of the plurality of conical light beams are the actual optical surfaces, and each of the actual optical surfaces mutually intersect.

4. The illumination beam shaping system according to claim 1, wherein the bottom portions of the plurality of conical light beams are the actual optical surfaces, and each of the actual optical surfaces mutually aggregate.

5. The illumination beam shaping system according to claim 1, wherein the curved surfaces of the curved lenses face the diffusing component, the incident light surfaces of the curved lenses are flat surfaces, and position of each point within the area of each of the incident light surfaces enables effective entry of the light beam of the light excitation chip; incident angle of the light beam is smaller than the refraction critical angle.

6. An illumination beam shaping system having total quantity of light form a light excitation chip enabled to undergo a pre-dividing operation, and then post-diffusion to cause an optical illuminating surface of the system to obtain uniform illumination brightness, comprising:
    a light-emitting element, wherein the light-emitting element is a light excitation chip for producing a light beam with angular illumination;
    a dividing device, which is structured from a planar assembly of a plurality of curved lens provided with curvature arranged in an array, and an assembly of incident light surfaces of the plurality of curved lenses form an input side of the dividing, device, while the other side forms an output side assembled from emergent faces of the plurality of curved lenses; the input side faces the light beam projection surface of the light-emitting element;
    an optical diffusing component, provided with an incident plan of curved form with a concave curvature, wherein the incident plane faces the output side of the dividing device, and is positioned at bottom portions, which function as actual optical surfaces, of the conical light beams emitted from the output side,
    wherein the area of the incident light surface of each of the curved lenses assembled to form the dividing device has a different curvature.

7. The illumination beam shaping system according to claim 6, wherein the curved lenses assembled to form the dividing device are of square form.

8. The illumination beam shaping system according to claim 6, wherein the bottom portions of the plurality of conical light beams are the actual optical surfaces, and each of the actual optical surfaces mutually intersect.

9. The illumination beam shaping system according to claim 6, wherein the bottom portions of the plurality of conical light beams are the actual optical surfaces, and each of the actual optical surfaces mutually aggregate.

10. The illumination beam shaping system according to claim 6, wherein the curved surfaces of the curved lenses face the diffusing component, the incident light surfaces of the curved lenses are flat surfaces, and a position of each point within the area of each of the incident light surfaces enables effective entry of the light beam of the light excitation chip; incident angle of the light beam is smaller than the refraction critical angle.

11. An illumination beam shaping system having total quantity of light form a light excitation chip enabled to undergo a pre-dividing operation, and then post-diffusion to cause an optical illuminating surface of the system to obtain uniform illumination brightness, comprising:
    a light-emitting element, wherein the light-emitting element is a light excitation chip for producing a light beam with angular illumination;

a dividing device, which is structured from a planar assembly of a plurality of curved lens provided with curvature arranged in an array, and an assembly of incident light surfaces of the plurality of curved lenses form an input side of the dividing device, while the other side forms an output side assembled from emergent faces of the plurality of curved lenses; the input side faces the light beam projection surface of the light-emitting element;

an optical diffusing component, provided with an incident plane of curved form with a concave curvature, wherein the incident plane faces the output side of the dividing device, and is positioned at bottom portions, which function as actual optical surfaces, of the conical light beams emitted from the output side, wherein the curved surfaces of the curved lenses face the diffusing component, the incident light surfaces of the curved lenses are flat surfaces.

12. The illumination beam shaping system according to claim 11, wherein the curved lenses assembled to form the dividing device are of square form.

13. The illumination beam shaping system according to claim 11, wherein the bottom portions of the plurality of conical light beams are the actual optical surfaces, and each of the actual optical surfaces mutually intersect.

14. The illumination beam shaping system according to claim 11, wherein the bottom portions of the plurality of conical light beams are the actual optical surfaces, and each of the actual optical surfaces mutually aggregate.

15. The illumination beam shaping system according to claim 11, wherein a position of each point within the area of each of the incident light surfaces enables effective entry of the light beam of the light excitation chip; incident angle of the light beam is smaller than the refraction critical angle.

* * * * *